(12) United States Patent
Nitschke et al.

(10) Patent No.: US 9,296,637 B2
(45) Date of Patent: Mar. 29, 2016

(54) METHOD FOR PRESS FORMING GLASS SHEETS

(75) Inventors: David B. Nitschke, Perrysburg, OH (US); Dean M. Nitschke, Maumee, OH (US); Mace L. Odneal, Rossford, OH (US); Ashoka G. Jinka, Maumee, OH (US)

(73) Assignee: GLASSTECH, INC., Perrysburg, OH (US)

( * ) Notice: Subject to any disclaimer, the term of this patent is extended or adjusted under 35 U.S.C. 154(b) by 1090 days.

(21) Appl. No.: 12/796,962

(22) Filed: Jun. 9, 2010

(65) Prior Publication Data

US 2011/0302964 A1 Dec. 15, 2011

(51) Int. Cl.
 *C03B 23/023* (2006.01)
 *C03B 23/025* (2006.01)
 *C03B 23/03* (2006.01)
 *C03B 23/035* (2006.01)

(52) U.S. Cl.
 CPC ............ *C03B 23/0254* (2013.01); *C03B 23/03* (2013.01); *C03B 23/0357* (2013.01)

(58) Field of Classification Search
 USPC ............................. 65/106, 287, 289, 290, 291
 See application file for complete search history.

(56) References Cited

U.S. PATENT DOCUMENTS

| | | | |
|---|---|---|---|
| 4,252,552 A | 2/1981 | Frank | |
| 4,632,691 A | 12/1986 | Smith et al. | |
| 5,004,491 A | 4/1991 | McMaster et al. | |
| 5,318,615 A | 6/1994 | Nagai et al. | |
| 5,849,056 A * | 12/1998 | May et al. | 65/106 |
| 5,858,047 A * | 1/1999 | Frank et al. | 65/104 |
| 6,543,255 B2 | 4/2003 | Bennett et al. | |
| 6,578,383 B2 | 6/2003 | Bennett et al. | |
| 7,237,708 B1 | 7/2007 | Guy et al. | |
| 7,240,519 B2 * | 7/2007 | Schwartz et al. | 65/104 |
| 2002/0189290 A1 | 12/2002 | Bennett | |
| 2005/0274146 A1 | 12/2005 | Schnabel, Jr. | |

FOREIGN PATENT DOCUMENTS

| | | | |
|---|---|---|---|
| JP | 5650128 A | | 5/1981 |
| JP | 0558659 A | | 3/1993 |
| JP | 2677451 B2 | | 11/1997 |
| JP | 2004530624 A | | 10/2004 |
| RU | 2317262 C2 | | 2/2008 |
| WO | 02102727 A1 | | 12/2002 |
| WO | 2008068526 A1 | | 6/2008 |

OTHER PUBLICATIONS

Russian Office Action Action Dated Jul. 1, 2015, Application No. 2012153929/03(085679), 12 Pages.

(Continued)

*Primary Examiner* — Queenie Dehghan
(74) *Attorney, Agent, or Firm* — Brooks Kushman P.C.

(57) ABSTRACT

A method, press station (12), and system (10) for forming glass sheets that are initially formed with an upwardly concave curved shape with end portions (86) and an intermediate portion (88) having straight line elements that are subsequently formed with curved shapes to provide curvature along transverse directions. The forming is performed by initially providing curvature to the straight line elements of the glass sheet end portions while the intermediate portion (88) still has the straight line elements. The glass sheet intermediate portion is subsequently formed to provide curvature to its straight line elements so the glass sheet has curvature in transverse directions.

9 Claims, 6 Drawing Sheets

(56) References Cited

OTHER PUBLICATIONS

Japanese Reasons for Refusal Notice Dated Mar. 23, 2015, Application No. 2013-514175, 3 Pages.

Chinese First Office Action Dated Oct. 28, 2014, Application No. 201180026439.6, Applicant Glasstech, Inc., 6 Pages.

Russian Office Action Dated Mar. 27, 2015, Application No. 2012153929/03(085679), Applicant Glasstech, Inc., 5 Pages.

* cited by examiner

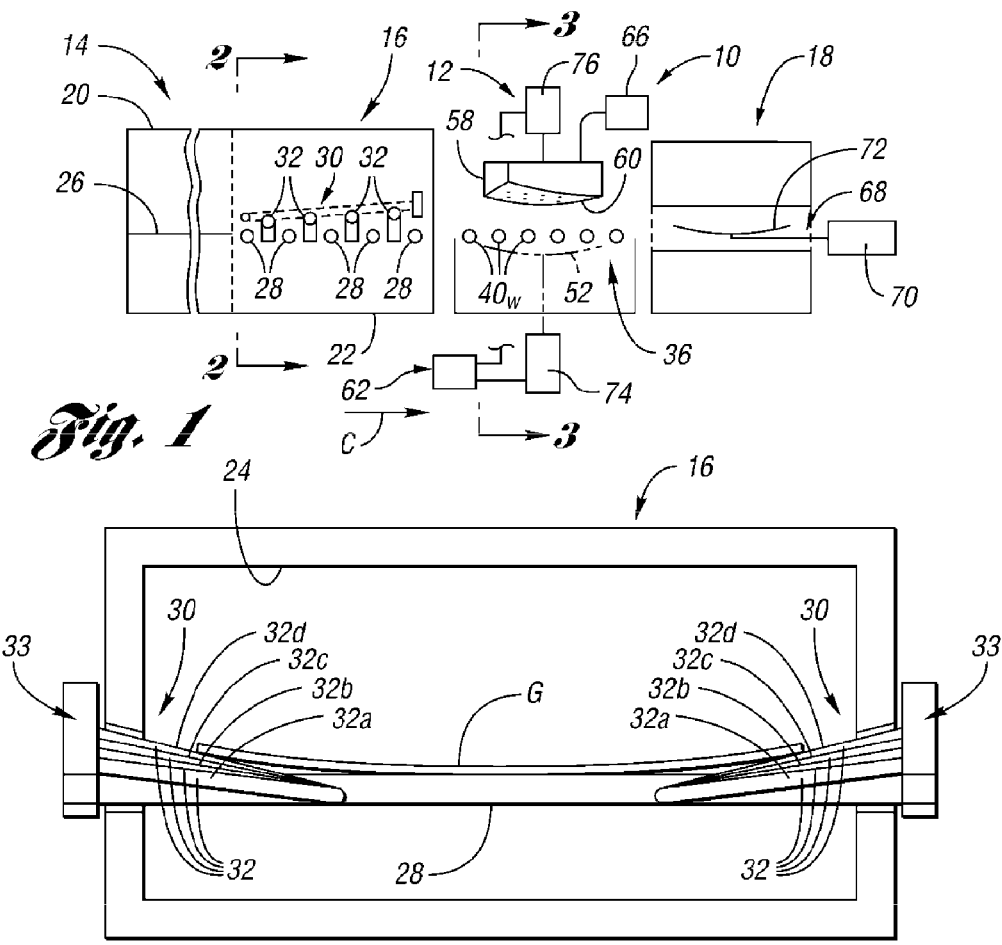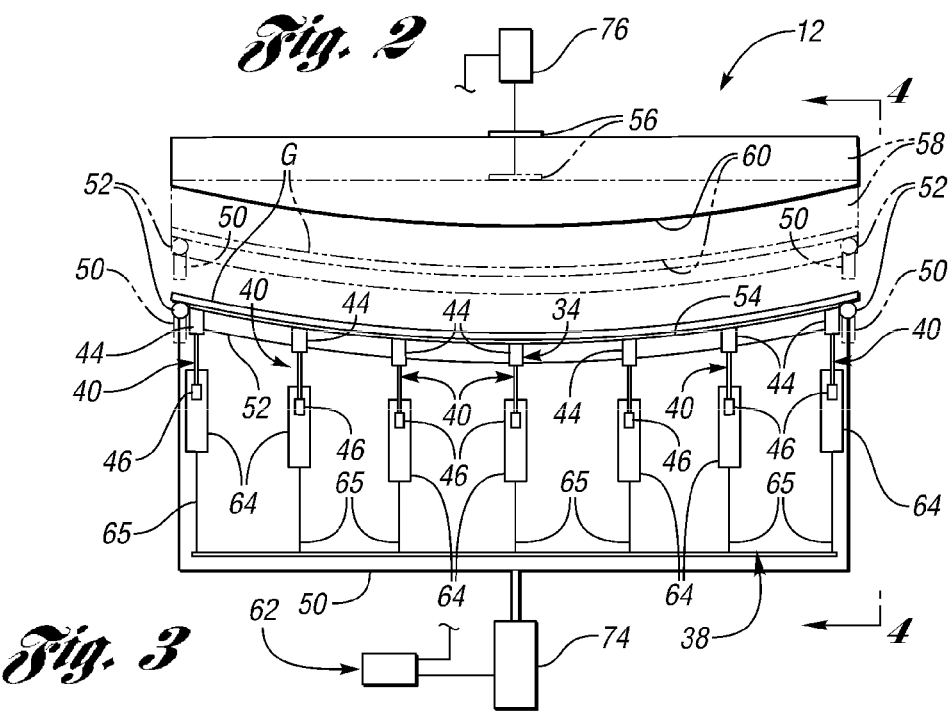

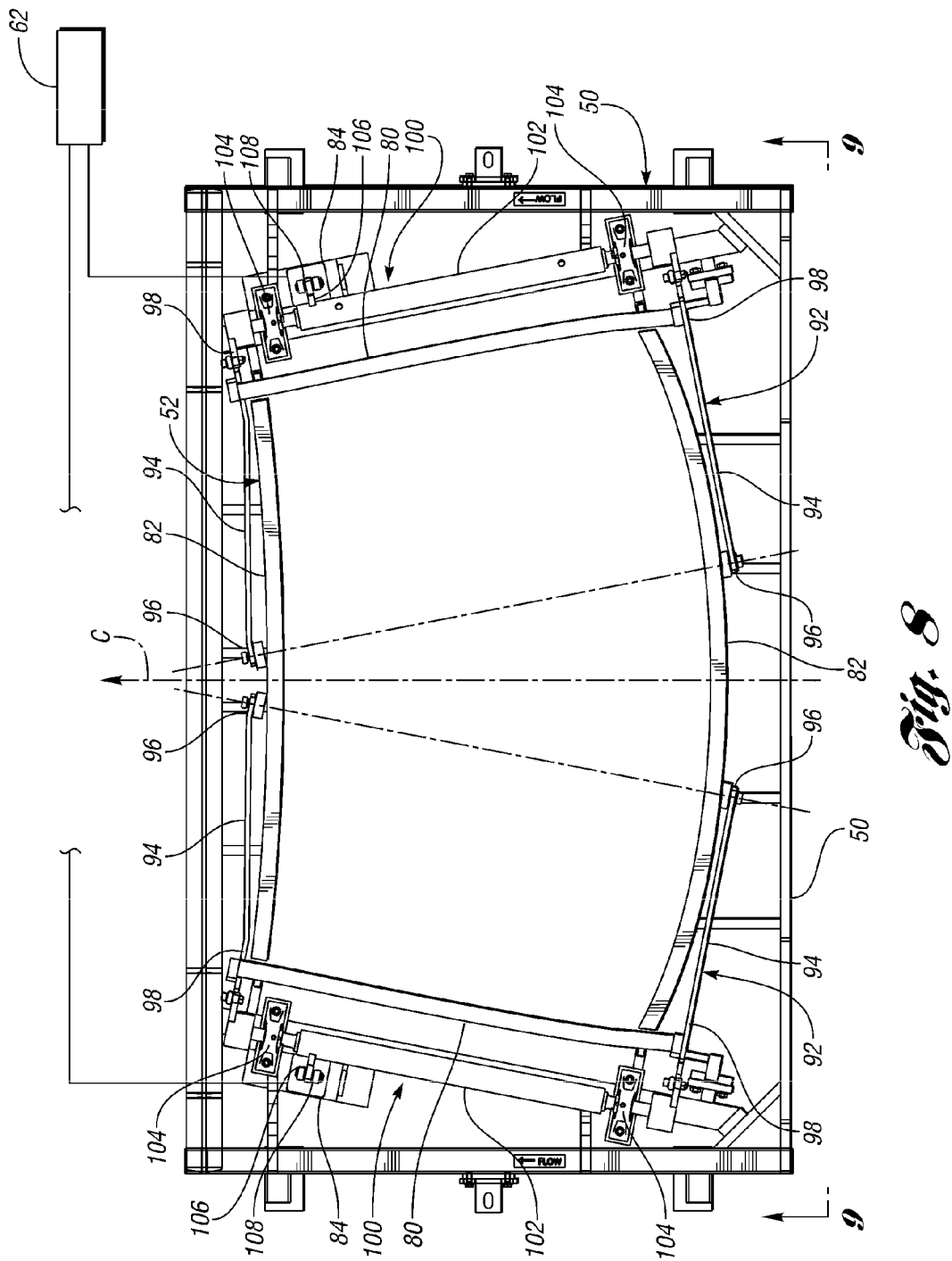

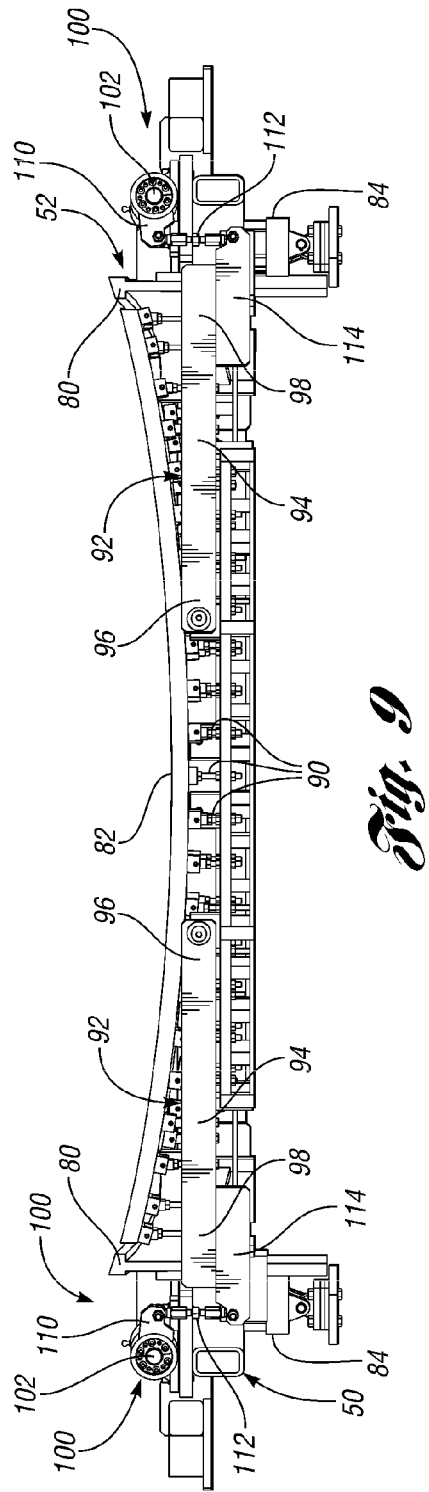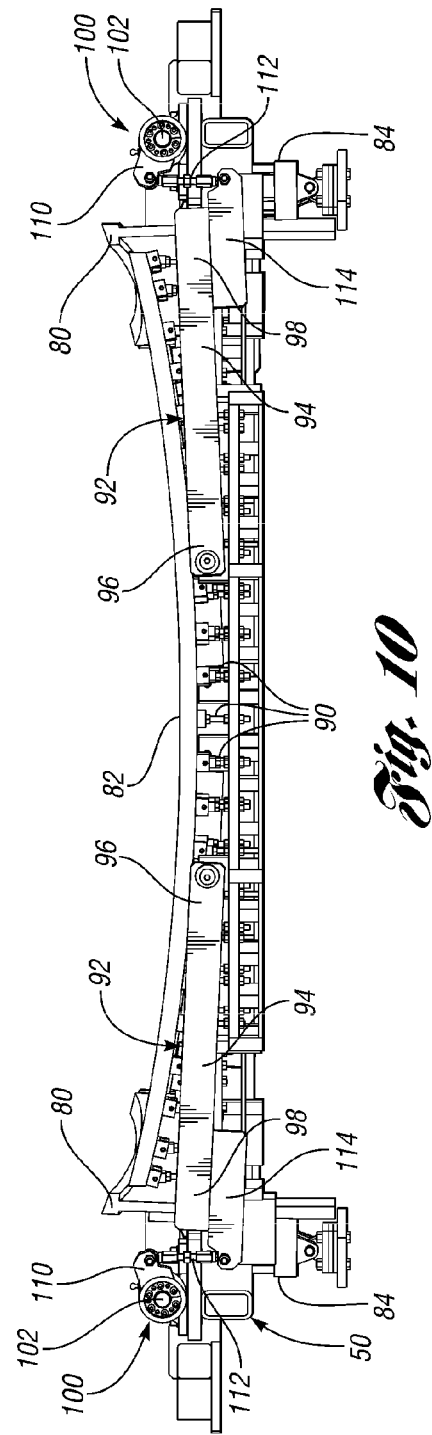

METHOD FOR PRESS FORMING GLASS SHEETS

BACKGROUND OF THE INVENTION

1. Field of the Invention

This invention relates to a method for forming glass sheets, to a press station for forming glass sheets, and to a press forming system for forming glass sheets.

2. Background Art

Glass sheets can be press formed, which also is sometimes referred to as being press bent, after being heated sufficiently to permit such forming. This forming can be with curvature that has straight line elements as have cylindrical or conical shapes. Actually, in the press forming industry, conical glass sheets having the straight line elements are referred to as cylindrical curvature just like those with actual cylindrical shapes having the straight line elements. As disclosed in U.S. Pat. No. 6,543,255 Bennett et al. and U.S. Pat. No. 6,578,383 Bennett et al., the entire disclosures of which are hereby incorporated by reference, glass sheets heated within a heating chamber to a sufficiently high temperature for forming can be roll formed by inclined rolls and then conveyed to a press station for press forming to a final shape. The press forming can be so as to maintain the straight line elements or to provide curvature to the straight line elements so that the glass sheet is formed in transverse directions, which in the glass industry is referred to as being formed with "cross bend" or "cross curvature."

SUMMARY OF THE INVENTION

One object of the present invention is to provide an improved method for forming glass sheets.

In carrying out the above object, the method for forming glass sheets is performed by initially forming a heated flat glass sheet to an upwardly concave curved shape with upper end portions and a lower intermediate portion extending between the upper end portions, with the upper end portions and intermediate portion having shapes with straight line elements, and with the glass sheet curved transversely to the straight line elements. The initially formed glass sheet is located below an upper mold having a downwardly facing surface with downwardly convex curvature along transverse directions. The end portions of the glass sheet are moved upwardly relative to the intermediate portion to initially contact the end portions of the glass sheet with the downwardly facing surface of the upper mold to form the straight line elements of the end portions with curvature while the intermediate portion of the glass sheet still has its straight line elements without any significant curvature. Thereafter, the intermediate portion of the glass sheet is moved upwardly relative to its end portions to contact the intermediate portion of the glass sheet with the downwardly facing surface of the upper mold to also form the straight line elements of the intermediate portion with curvature so the entire glass sheet is curved along transverse directions.

The glass sheet can be initially formed with a generally cylindrical shape that has the straight line elements or can be initially formed with a conical shape that has the straight line elements.

As disclosed, the straight line elements of the end portions of the glass sheet are formed with curvature against the upper mold before the intermediate portion contacts the upper mold.

It is also possible for the end portions of the glass sheet to be pressed against the downwardly facing surface of the upper mold with a predetermined force that is subsequently reduced to facilitate movement of the end portions of the glass sheet along the downwardly facing surface of the upper mold as the intermediate portion of the glass sheet continues to move upwardly for forming against the downwardly facing surface of the upper mold.

The heated flat glass sheet as disclosed is initially formed within a heating chamber on a conveyor by inclined rolls of progressively increasing inclination along a direction of conveyance and is then conveyed out of the heating chamber to a press station at which the upper mold is located.

The initially formed glass sheet is disclosed as being lifted upwardly off of the conveyor in the press station by a lower ring that is moved upwardly from below the glass sheet and has: (a) end portions spaced laterally from each other relative to the direction of conveyance with upwardly concave curved shapes along the direction of conveyance, and (b) intermediate portions spaced from each other along the direction of conveyance with upwardly concave curved shapes extending transversely to the direction of conveyance between the end portions of the lower ring. After the lower ring lifts the glass sheet upwardly off the conveyor, the end portions of the lower ring are moved upwardly relative to the intermediate portions of the lower ring to contact and form the end portions of the glass sheet against the downwardly facing surface of the upper mold while the intermediate portion of the glass sheet is still located below the downwardly facing surface of the upper mold, and after the end portions of the lower ring form the end portions of the glass sheet against the downwardly facing surface of the upper mold, the intermediate portions of the lower ring are moved upwardly to contact and form the intermediate portion of the glass sheet with the downwardly facing surface of the upper mold to complete the press forming.

Furthermore, the end portions of the glass sheet are disclosed as each being initially pressed against the downwardly facing surface of the upper mold by the end portions of the lower ring with a predetermined force that can be subsequently reduced to facilitate movement of the end portions of the glass sheet along the downwardly facing surface of the upper mold as the intermediate portion of the glass sheet continues to be moved upwardly by the intermediate portions of the lower ring into contact for forming against the downwardly facing surface of the upper mold.

Another object of the present invention is to provide an improved glass sheet press station.

In carrying out the immediately preceding object, the glass sheet press station includes a conveyor for conveying along a direction of conveyance a heated and initially formed glass sheet having an upwardly concave shape including upper end portions spaced laterally from each other with respect to the direction of conveyance and a lower intermediate portion that extends transversely with respect to the direction of conveyance between the end portions, with the upper end portions and the lower intermediate portion having straight line elements, and with the glass sheet curved transversely to the straight line elements. The press station includes a lower ring over which the glass sheet is conveyed. The lower ring has end portions spaced laterally from each other relative to the direction of conveyance with upwardly concave curved shapes along the direction of conveyance, and the lower ring also has intermediate portions spaced from each other along the direction of conveyance with upwardly concave curved shapes extending transversely to the direction of conveyance between the end portions of the lower ring. The end portions and the intermediate portions of the lower ring are movable vertically together with each other and independently of each other. An upper mold of the press station is located above the lower ring and has a downwardly facing surface with downwardly convex curvature both along and transverse to the direction of conveyance in complementary relationship to the curvature of the end portions and intermediate portions of the lower ring. An actuator of the press station: initially moves the end portions and the intermediate portions of the lower ring upwardly together with each other to lift the initially formed glass sheet upwardly off of the conveyor; then moves the end portions of the lower ring upwardly relative to the intermediate portions of the lower ring to move the end portions of the glass sheet upwardly into contact with the downwardly facing surface of the upper mold to provide curvature to the straight line elements of the end portions of the glass sheet while the intermediate portion of the glass sheet has not yet been formed by the upper mold; and thereafter moves the intermediate portions of the lower ring upwardly relative to its end portions to contact and form the intermediate portion of the glass sheet against the downwardly facing surface of the upper mold to provide curvature to the straight line elements of the intermediate portion of the glass sheet so the entire glass sheet has curvature in transverse directions.

The lower ring of the press station is disclosed as including a support frame on which the intermediate portions of the lower ring are mounted for movement with the support frame, and a pair of connections that respectively mount the end portions of the lower ring on the support frame for vertical movement with respect thereto and with respect to the intermediate portions of the lower ring. The pair of connections are shown as including pivotal arms having first ends that are pivotally mounted on the support frame and second ends that respectively mount the end portions of the lower ring.

The actuator of the press station is disclosed as including cylinders for applying upward force to the end portions of the lower ring so as to move upwardly relative to the intermediate portions of the lower ring to provide the movement of the end portions of the glass sheet upwardly into contact with the downwardly facing surface of the upper mold to provide forming thereof along the direction of conveyance while the intermediate portion of the glass sheet has not yet been formed by the upper mold. Furthermore, the actuator may operate the cylinders to reduce the upward force applied to the end portions of the lower ring as the intermediate portions of the lower ring are moved upwardly relative to the end portions of the lower ring to facilitate movement of the glass sheet end portions relative to the downwardly facing surface of the upper mold as the intermediate portions of the lower ring move the intermediate portion of the glass sheet into contact with the downwardly facing surface of the upper mold to provide the forming thereof along the direction of conveyance. In addition, the lower ring is disclosed as including adjustors for adjusting the positions of its end portions and intermediate portions relative to each other.

Another object of the present invention is to provide an improved glass sheet press forming system.

In carrying out the immediately preceding object, the glass sheet press forming system includes a conveyor for conveying glass sheets along a direction of conveyance and a furnace having a heating chamber through which the conveyor conveys glass sheets from an entrance end of the furnace toward an exit end thereof for heating in preparation for forming. Adjacent its exit end the furnace includes inclined rolls of progressively increasing inclination along the direction of conveyance so as to initially form each glass sheet with an upwardly concave curved shape extending transversely with respect to the direction of conveyance with upper end portions and a lower intermediate portion extending between the end portions, with the upper end portions and the lower intermediate portion having straight line elements, and with the glass sheet curved transversely to the straight line elements. The system includes a press station to which the conveyor conveys the initial formed glass sheet at a location downstream from the exit end of the furnace. The press station includes a lower ring over which the glass sheet is conveyed. The lower ring includes end portions spaced laterally from each other relative to the direction of conveyance with upwardly concave curved shapes along the direction of conveyance, and the lower ring includes intermediate portions spaced from each other along the direction of conveyance with upwardly concave curved shapes extending transversely to the direction of conveyance between the end portions of the lower ring. The end portions and the intermediate portions of the lower ring are movable vertically together with each other and independently of each other. The press station also includes an upper mold located above the lower ring and having a downwardly facing surface with convex curvature both along and transverse to the direction of conveyance in complementary relationship to the curvature of the end portions and intermediate portions of the lower ring. An actuator of the press station: initially moves the end portions and the intermediate portions of the lower ring upwardly together with each other to lift the initially formed glass sheet upwardly off of the conveyor; then moves the end portions of the lower ring upwardly relative to the intermediate portions of the lower ring to move the end portions of the glass sheet upwardly into contact with the downwardly facing surface of the upper mold to provide curvature to the straight line elements of the end portions of the glass sheet while the intermediate portion of the glass sheet is still below the upper mold; and thereafter moves the intermediate portions of the lower ring upwardly relative to its end portions to contact the intermediate portion of the glass sheet with the downwardly facing surface of the upper mold to provide curvature to the straight line elements of the intermediate portion of the glass sheet so the entire glass sheet has curvature in transverse directions.

The objects, features and advantages of the present invention are readily apparent from the following detailed description of the preferred embodiment when taken in connection with the accompanying drawings.

BRIEF DESCRIPTION OF THE DRAWINGS

FIG. 1 is a schematic side elevation view of a glass sheet press forming system that includes a press station whose operation performs forming of glass sheets in transverse directions.

FIG. 2 is a schematic cross sectional view through the system taken along the direction of line 2-2 in FIG. 1 at an exit end of a furnace of the system and illustrates horizontal and inclined rolls on which heated glass sheets are conveyed for initial roll forming prior to exiting the furnace in preparation for press forming.

FIG. 3 is a schematic cross sectional view taken through the system along line 3-3 in FIG. 1 at its press station to illustrate the construction of a lower ring and an upper press mold that are movable between the solid and phantom line indicated positions to press bend the initially roll formed glass sheet.

FIG. 8 is a top plan view of the lower ring.

FIG. 9 is an elevational view of the lower ring taken along the direction of line 9-9 in FIG. 8, which is in the direction of conveyance, but with portions of the lower ring removed to illustrate its left and right end portions as being at the same elevation as left and right ends of intermediate portions of the lower ring which is the positioning involved during initial and final processing at the press station.

FIG. 10 is a view similar to FIG. 9 but shows the lower ring with its right and left end portions raised with respect to the right and left ends of the intermediate portions of the lower ring which is positioning involved during an intermediate portion of the press forming operation.

DETAILED DESCRIPTION OF THE PREFERRED EMBODIMENT

Figure 4:
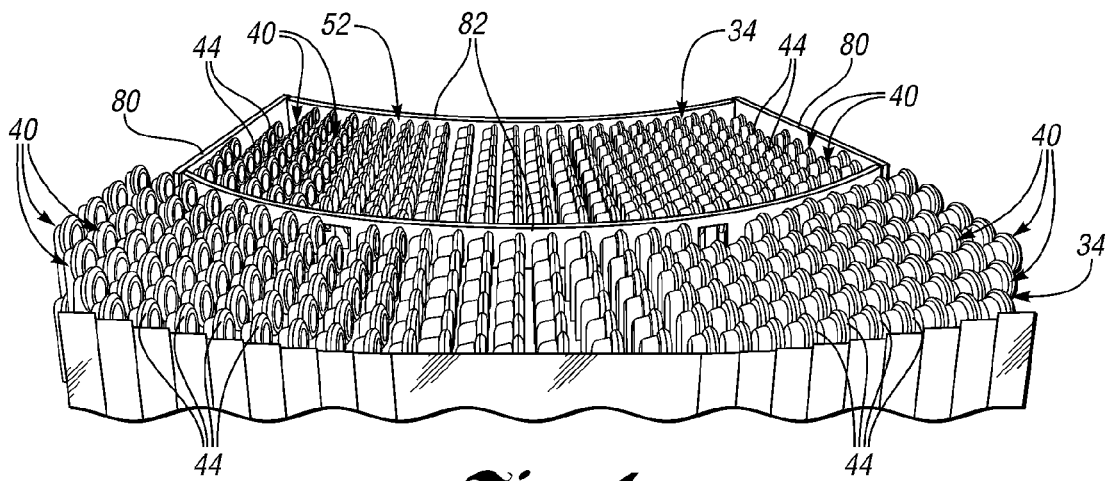
FIG. 4 is a perspective view illustrating wheel conveyor assemblies of the conveyor that convey the initially formed glass sheet to above the lower ring of the press station for the press forming.

With reference to FIG. 1 of the drawings, a system for press forming glass sheets is generally indicated by 10 and includes a press forming station 12 whose construction and method of operation will be described in an integrated manner with the entire system to facilitate an understanding of different aspects of the system.

With continuing reference to FIG. 1, the system 10 includes a furnace 14 having a roll forming station 16 just upstream along a direction of conveyance C from the press bending station 12. Downstream from the press forming station 12 along the direction of conveyance C, the system 10 is illustrated as including a final processing station 18 at which the formed glass sheet can be slowly cooled for annealing or more rapidly cooled by quenching to provide heat strengthening or tempering.

As illustrated by continuing reference to FIG. 1, the furnace 14 has entry and exit ends 20 and 22 and includes a heating chamber 24 (FIG. 2) having a conveyor 26 for conveying glass sheets along the direction of conveyance through the furnace from the entry end to the exit end. The conveyor 26 on which the glass sheets are heated can be either a conventional gas hearth or a roll conveyor on which the glass sheets are conveyed during heating from ambient temperature to a sufficiently high temperature to permit forming, i.e., also referred to as bending in the glass sheet industry.

The furnace exit end 22 includes the roll forming station 16 which is illustrated in FIG. 2 as having horizontally extending conveyor rolls 28 that are rotatively driven and spaced horizontally within the heating chamber along the direction of conveyance extending laterally with respect thereto to support and convey the heated glass sheets. The roll forming station 16 also includes a pair of sets 30 of bending rolls 32, with the bending roll sets 30 spaced laterally with respect to each other within the heating chamber 24 along the direction of conveyance. Each set of bending rolls 30 is supported and rotatively driven by a drive mechanism 33 with the bending rolls at progressively increasing inclinations along the direction of conveyance as illustrated by reference numerals $32_a$, $32_b$, $32_c$, and $32_d$ in FIG. 2. The conveyance of each heated glass sheet G along the direction of conveyance in cooperation with the bending rolls 32 provides initial forming of the glass sheet G along a direction transverse to the direction of conveyance as illustrated in FIG. 2. This forming provides the glass sheet with straight line element that may be parallel to each other in a cylindrical shape or angled with respect to each other in a conical shape. As each location of the glass sheet along the direction of conveyance is bent from its flat shape, this bending also further bends the preceding location such that the net effect is a slightly conical shape.

With combined reference to FIGS. 1 and 3, the press forming station 12 as previously mentioned is located externally of the furnace 14 downstream from its exit end 22 to receive the initially formed glass sheets from the roll forming station 16. More specifically, the press forming station 12 includes a lower wheel bed 34 of the conveyor for receiving an initially formed glass sheet to be further press formed by press forming apparatus collectively indicated by 36. The lower wheel bed 34 includes a lower base structure 38 and a plurality of conveyor wheel assemblies 40. Each wheel assembly 40 as is hereinafter more fully described includes a housing having an upper end including a wheel 44 and having a lower end including a detachable connection 46 for detachably connecting the wheel assembly to the support 38. A drive mechanism provides rotational driving of the wheel 44 of each wheel assembly 40 upon connection thereof to the support 38. For a more detailed description of the conveyor and the drive mechanism, refer to U.S. Pat. No. 6,543,255 which has previously been incorporated by reference. Also, it should be noted that the conveyor instead of having only wheel conveyor assemblies can also have elongated roller conveyor assemblies both horizontally and inclined as disclosed by U.S. patent application Ser. No. 12/756,521 filed on Apr. 8, 2010 by Nitschke et al. under the title Press Bending Station And Method For Bending Heated Glass Sheets, the entire disclosure of which is hereby incorporated by reference.

As illustrated in FIG. 3, a lower press ring support frame 50 of the press forming apparatus 36 supports a lower press ring 52 that has an upwardly concave shape and is received within the wheel bed 34 below the wheels 44 of the wheel conveyor assemblies 40 in a ring shape thereof where no wheel assemblies are located. The construction of the lower press ring is hereinafter more fully described. As illustrated in FIG. 3, an upper mount 56 of the press station 12 supports an upper press mold 58 of the press forming apparatus 36. This upper press mold 58 has a downwardly facing convex forming face or surface 60 complementary to the upwardly concave shape 54 of the lower press ring 52.

An actuator collectively indicated by 62 in FIG. 3 provides relative vertical movement between the lower press ring 52 and the wheel bed 34 and between the lower press ring and the upper press mold 58 to move the heated glass sheet above the wheel bed and ultimately into pressing engagement between the lower press ring and the upper press mold to press form the glass sheet as is hereinafter more fully described. As disclosed, the actuator not only moves the lower press ring 52 upwardly but also moves the upper press mold 58 downwardly so as to more rapidly decrease the spacing between the lower press ring and the upper mold and thereby reduces the cycle time. However, it is possible to only move the lower press ring 52 upwardly to perform the pressing operation but with a longer cycle time.

The press forming station 12 as illustrated by FIG. 3 and described above has the wheel bed 34 provided with an upwardly curved shape in a direction transverse to the direction of conveyance along which the wheel bed receives the heated glass sheet corresponding to the initially formed shape provided by the roll forming station 16 illustrated in FIGS. 1 and 2. More specifically, the lower base structure 38 of the wheel bed 34 includes a plurality of rails 64 that extend along the direction of conveyance and have different elevations, as provided by schematically indicated adjusters 65 as shown in FIG. 3, along a direction transverse to the direction of conveyance to provide the curved shape of the wheel bed.

Figure 5:
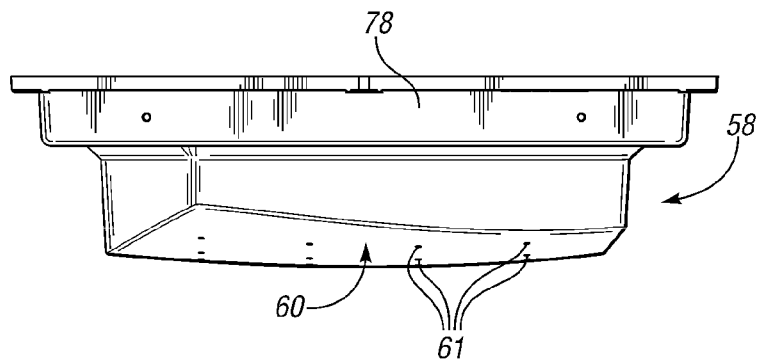
FIG. 5 is a side elevational view of the upper mold taken in the same direction as FIG. 1 to illustrate its downwardly facing surface against which the final forming takes place.
Figure 6:
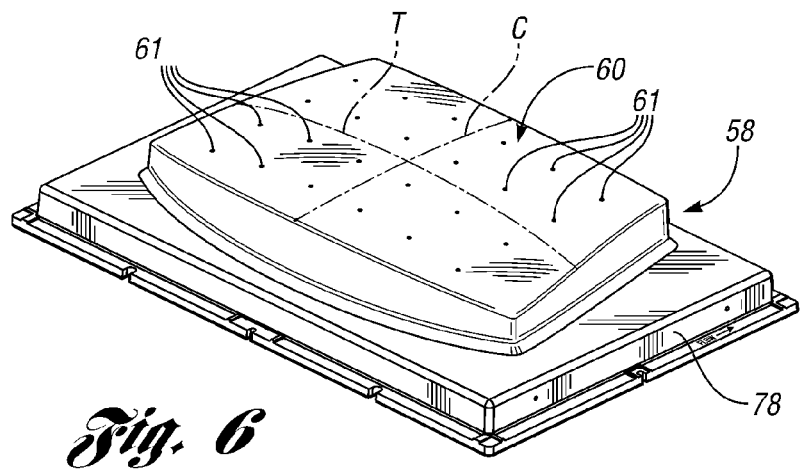
FIG. 6 is a perspective view of the upper mold turned upside down to illustrate the curvature of the downwardly facing mold surface in transverse directions both along and transverse to the direction of conveyance.

With reference to FIGS. 5 and 6, the upper press mold 58 has its forming face 60 provided with an array of holes 61 at which a vacuum is provided from a vacuum source 66 shown in FIG. 1 so as to support the formed glass sheet after the press forming and ensure forming of the glass sheet to the shape of the forming face. Upon downward movement of the lower press ring 52 and upward movement of the upper press mold 58 provided by actuator 62, a shuttle 68 of the final processing station 18 is moved by an actuator 70 to move a delivery ring 72 toward the left below the upper mold 58. Termination of the vacuum provided by the vacuum source 66 may then be accompanied by the supply of pressurized gas to the upper mold surface 60 to release the glass sheet onto the delivery ring 72 and the shuttle actuator 70 then moves the shuttle 68 back toward the right to the position illustrated such that the delivery ring 72 and the formed glass sheet thereon are delivered for final processing such as slow cooling for annealing or more rapid cooling by air quenching for heat strengthening or tempering.

With continuing reference to FIG. 3, the actuator 62 previously described includes a lower vertical operator 74 for moving the lower press ring support 50 and the lower press ring 52 vertically relative to the conveyor wheels 44 and also includes an upper vertical operator 76 for moving the upper press mold 58 vertically relative to framework of the press station and relative to the lower press ring.

With reference to FIGS. 5 and 6, the upper mold 58 is supported on a mold support 78 with its surface 60 facing downwardly during use with a downwardly convex shape as shown in FIG. 5. This downwardly facing mold surface 60 has curvature in transverse directions as illustrated by the phantom line C that is curved along the direction of conveyance and by the phantom line T that is curved along a direction transverse to the direction of conveyance.

Figure 7:
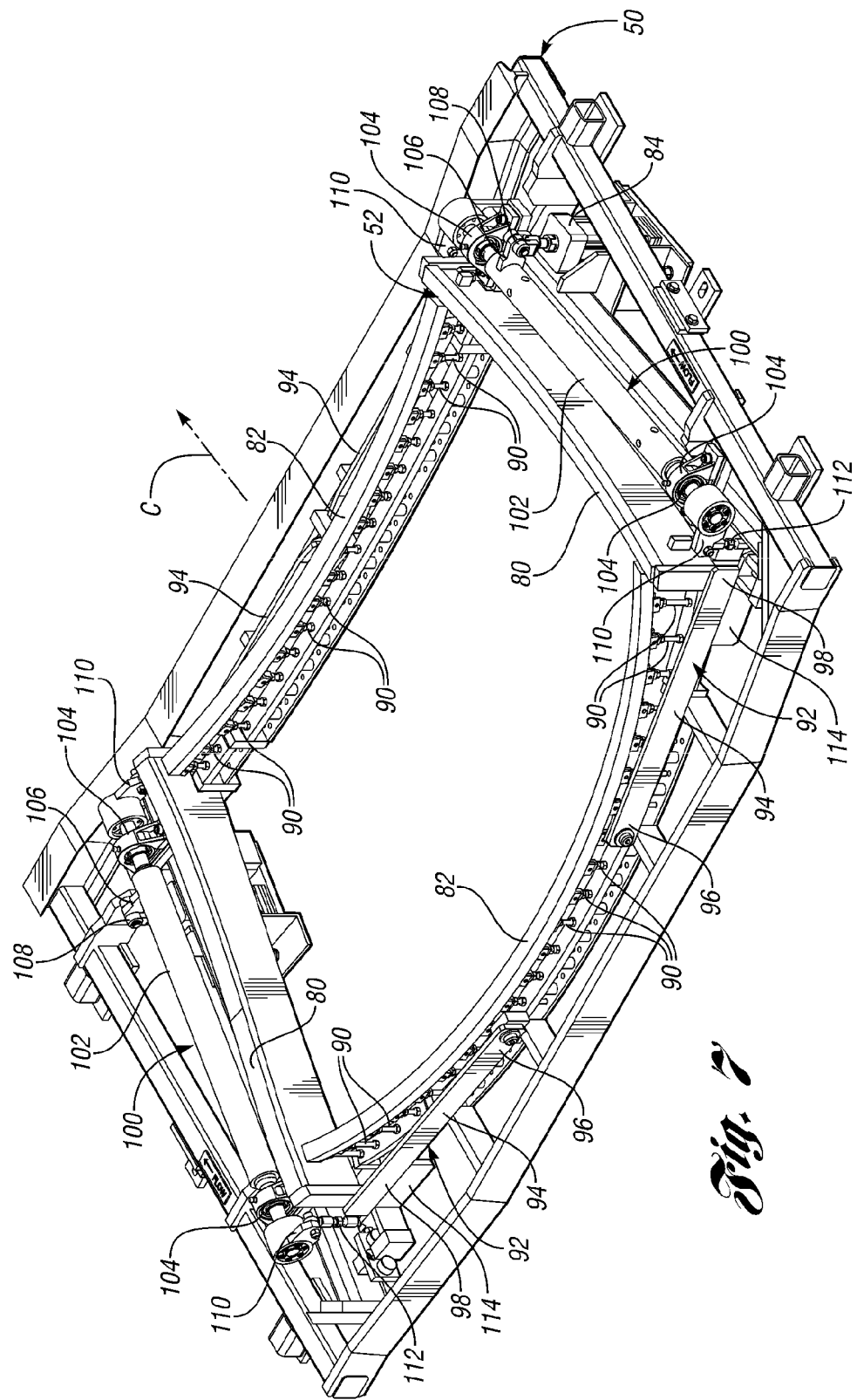
FIG. 7 is a perspective view of the lower ring.

As illustrated in FIGS. 7 and 8, the lower press ring 52 includes end portions 80 that are spaced laterally from each other relative to the direction of conveyance and have upwardly concave curved shapes along the direction of conveyance. Actually due to their somewhat converging shape as illustrated best in FIG. 8, the lower press ring end portions 80 converge slightly along the direction of conveyance and thus also extend to some extent transversely to the direction of conveyance C. The lower press ring 52 also includes intermediate portions 82 spaced from each other along the direction of conveyance with upwardly concave curved shapes extending transversely to the direction of conveyance between the end portions 80 of the lower press ring. As is hereinafter more fully described, the end portions 80 and the intermediate portions 82 of the lower press ring 52 are mounted on the lower support 50 so as to be movable vertically together with each other and independently of each other. More specifically, cylinders 84 respectively associated with the lower press ring end portions 80 are connected to the press ring actuator 62 and operated to provide vertical upward movement of the press ring end portions during the press forming operation as described below. This upward movement of the lower press ring end portions 80 relative to the intermediate portions 82 is illustrated in FIGS. 9 and 10.

Figure 11:
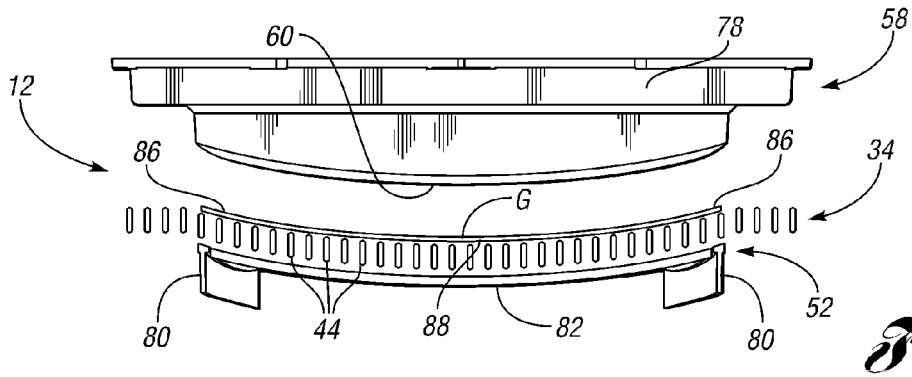
FIG. 11 is a schematic view at the press station taken along the direction of conveyance and showing the manner in which the wheel conveyor assemblies convey the glass sheet into the press station above the lower ring and below the upper mold.

With reference to FIG. 11, the press forming cycle begins as the initially formed glass sheet is conveyed on the wheel bed 34 into the press station 12 above the lower ring 52 and below the upper mold 58 with its downwardly facing surface 60 which has convex curvature both along and transverse to the direction of conveyance in complementary relationship to the end portions 80 and intermediate portions 82 of the lower press ring 52. The initially formed glass sheet G then has upper end portions 86 with straight line elements and an intermediate portion 88 that also has straight line elements as previously discussed.

Figure 12:
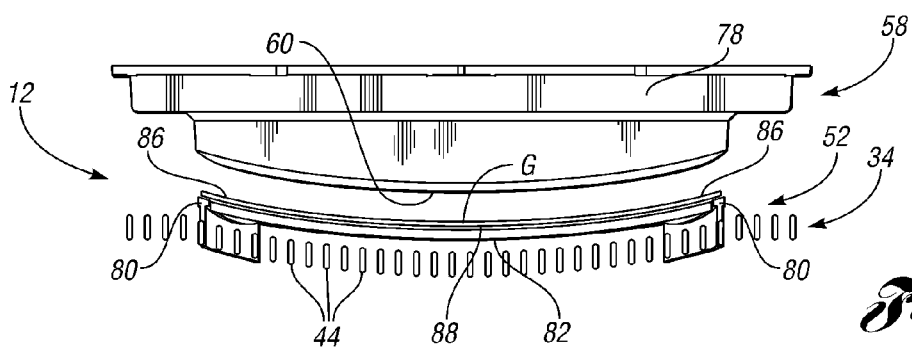
FIG. 12 is a schematic view similar to FIG. 11 but taken at a later stage after the lower ring has moved upwardly to lift the initially formed glass sheet upwardly off the conveyor into proximity with the downwardly facing surface of the upper mold.
Figure 13:
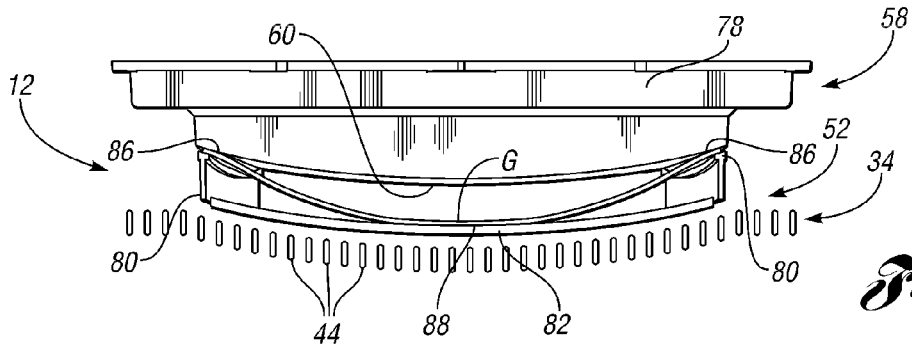
FIG. 13 is a schematic view similar to FIG. 12 but at a still later stage of the press bending cycle after end portions of the lower ring have lifted end portions of the initially formed glass sheet upwardly into contact with the downwardly facing surface of the upper mold.

After the initially formed glass sheet is received within the press station as shown in FIG. 11, the processing proceeds as the lower press ring 52 is moved upwardly by the press system actuator as previously described to lift the glass sheet upwardly off of the conveyor wheel bed 34 as shown in FIG. 12. The end portions 80 of the lower press ring 52 are then moved upwardly relative to the intermediate portions 82 of the lower press ring to press the end portions 86 of the glass sheet G against the downwardly facing surface 60 of the upper mold 58 as shown in FIG. 13. This upward movement of the lower press ring end portions 80 proceeds without an accompanying movement of the intermediate portions 82 of the lower press ring so that the ring end portions move upwardly relative to the intermediate portions. More specifically, the intermediate portions 82 of the lower press ring 52 do not move upwardly as fast as its end portions 80 during the upward movement of the end portions 80 whose pressing of the glass sheet end portions 86 against the mold surface 60 provides curvature to their straight line elements along the direction of conveyance. The intermediate portion 88 of the glass sheet G which has not yet contacted the mold surface 60 still has its straight line elements at this stage of the press cycle. It is also possible for the intermediate portions 82 of the lower press ring 52 to remain stationary during the continued upward movement of the end portions 80, however this results in a longer cycle time.

The press ring actuator moves the intermediate portions 82 of the lower press ring 52 upwardly relative to the press ring end portions 80 to press the intermediate portion 88 of the glass sheet G against the curved mold surface to provide curvature to its straight line elements along the direction of conveyance. Thus, the entire glass sheet has curvature along transverse directions.

When glass sheets are formed with curvature in transverse directions, the periphery of the glass sheet is too long to provide the forming without extra glass being present, and this extra glass is greatest at the locations farthest from the glass center, i.e., at the end portions 86. By forming the glass sheet end portions 86 with the transverse curvature initially, the excess peripheral glass is reduced at these locations and shared with the edges of the intermediate portion.

The press forming of this application has particular utility with vehicle windshields where the end portions of the glass sheet are mounted on the front windshield pillars at locations where any distortion causes greater optical problems than at the upper roof edge of the windshield and the lower cowl edge that extend along the opposite extremities of the glass sheet intermediate portion 88.

It should be mentioned that the spacing between the intermediate portion 88 of the glass sheet and the mold surface 60 as shown in FIG. 13 is exaggerated for purposes of illustration. More specifically, for a conventional size vehicle windshield glass sheet, this spacing is only nominally about 3 centimeters (slightly more than an inch). Furthermore, the processing can proceed even if the intermediate portion 88 of the glass sheet contacts the upper mold surface 60 while the glass sheet end portions are being pressed against the upper mold surface so long as there is no significant curvature provided to the straight line elements of the glass sheet intermediate portion until after the glass sheet end portions have been pressed against the upper mold surface to provide the curvature to their straight line elements. The term "no significant curvature" as used herein means the maximum "depth of curvature" from the glass sheet to a straight line between its extremities to which its straight line elements extend is no greater than 20% and preferably less than 10% of the maximum "depth of curvature" after the intermediate portion of the glass sheet has been fully formed.

With reference to FIGS. 7-10, the intermediate portions 82 of the lower press ring 52 are mounted on the support frame 50 by adjusters 90 which, as disclosed, are threaded adjusters whose rotational adjustment raises and lowers the adjacent portion of the intermediate portion to provide the required shape. A pair of connections generally indicated by 92 mount the end portions 80 of the lower press ring on the support frame 50 for vertical movement with respect thereto and with respect to the intermediate portions 82 of the lower press ring. The connections 92 as disclosed include pivotal arms 94 having first ends 96 pivotally mounted on the support frame 50 and second ends 98 that respectively mount the press ring end portions 80 at their opposite extremities.

As best shown in FIG. 7, the lower press ring end portions include operators 100 which each have a rotatable shaft 102 mounted for rotation on the support frame 50 by an associated pair of bearings 104. Adjacent one end of the shaft 102, a lever arm 106 has a pivotal connection 108 to the piston connecting rod of the cylinder 84 whose operation provides the independent movement of the lower press ring end portions 80. The forming station actuator 62 in addition to operating the lower press ring operator 74 and the upper press mold operator 76, also operates the cylinders 84.

Figure 14:
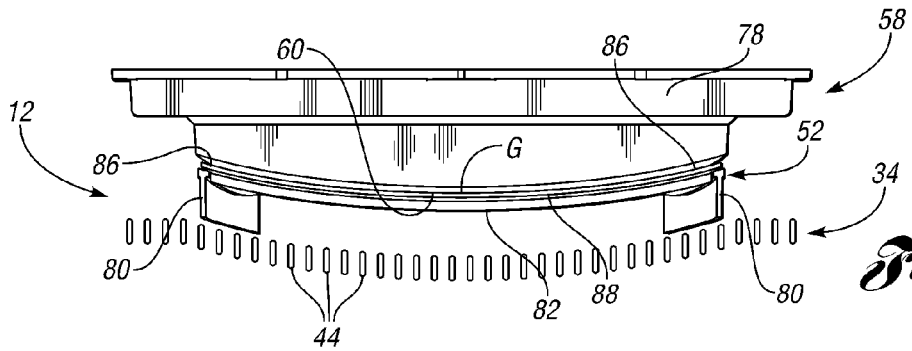
FIG. 14 is a schematic view similar to FIG. 13 but at a later stage after the intermediate portions of the lower ring have been moved upwardly to contact the intermediate portion of the glass sheet with the downwardly facing surface of the upper mold to complete the press forming of the glass sheet in transverse directions both along and transverse to the direction of conveyance.

Each end of each shaft 102 also includes a lever arm 110 which, as best shown in FIGS. 9 and 10, is pivotally connected to one end of an adjuster 112 whose other end is connected to an extension 114 of the adjacent second end of the pivotal arm 94 of the associated ring end portion connection 92. Threaded adjustment of the adjusters 112 provides vertical adjusting movement of the associated pressed ring end portion 80 relative to the press ring intermediate portions 82. Since the lever arm 106 of each operator 100 is on the opposite side of the associated shaft 102, downward movement of the piston connecting rod of cylinder 84 provides upward movement of the associated pressed ring end portion 80 relative to the press ring intermediate portions 82. After the press ring end portions 80 have provided the curvature to the straight line elements of the glass sheet end portions 86 as previously described in connection with FIG. 13, the fluid pressure supplied to the cylinders 84 can be reduced to facilitate movement of the glass sheet end portions along the mold surface as the intermediate portion is moved upwardly as shown in FIG. 14 to complete the forming. The amount of this movement to accommodate the difference in the chordal lengths of the glass sheet between FIGS. 13 and 14 is relatively small and operation to date has shown that satisfactory forming can be performed without the pressure reduction even though it may be helpful for some shapes.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A method for forming glass sheets comprising:
    initially forming a heated flat glass sheet to an upwardly concave curved shape with upper end portions and a lower intermediate portion extending between the upper end portions, with the upper end portions and intermediate portion having shapes with straight line elements, and with the glass sheet curved transversely to the straight line elements;
    locating the initially formed glass sheet below an upper mold having a downwardly facing surface with downwardly convex curvature along transverse directions;
    moving the end portions of the glass sheet upwardly relative to the intermediate portion to initially contact the end portions of the glass sheet with the downwardly facing surface of the upper mold to form the straight line elements of the end portions with curvature while the intermediate portion of the glass sheet still has straight line elements without any significant curvature; and
    thereafter moving the intermediate portion of the glass sheet upwardly relative to its end portions to contact the intermediate portion of the glass sheet with the downwardly facing surface of the upper mold to also form the straight line elements of the intermediate portion with curvature so the entire glass sheet is curved along transverse directions.

2. A method for forming glass sheets as in claim 1 wherein the glass sheet is initially formed with a cylindrical shape that has the straight line elements.

3. A method for forming glass sheets as in claim 1 wherein the glass sheet is initially formed with a conical shape that has the straight line elements.

4. A method for forming glass sheets as in claim 1 wherein the straight line elements of the end portions of the glass sheet are formed with curvature against the upper mold before the intermediate portion contacts the upper mold.

5. A method for forming glass sheets as in claim 1 wherein the end portions of the glass sheet are each initially pressed against the downwardly facing surface of the upper mold with a predetermined force that is subsequently reduced to facilitate movement of the end portions of the glass sheet along the downwardly facing surface of the upper mold as the intermediate portion of the glass sheet continues to move for forming against the downwardly facing surface of the upper mold.

6. A method for forming glass sheets as in claim 1 wherein the heated flat glass sheet is initially formed within a heating chamber on a conveyor by inclined rolls of progressively increasing inclination along a direction of conveyance and is then conveyed out of the heating chamber to a press station at which the upper mold is located.

7. A method for forming glass sheets as in claim 6 wherein the initially formed glass sheet is lifted upwardly off of the conveyor in the press station by a lower ring that is moved upwardly from below the glass sheet and has: (a) end portions spaced laterally from each other relative to the direction of conveyance with upwardly concave curved shapes along the direction of conveyance, and (b) intermediate portions spaced from each other along the direction of conveyance with upwardly concave curved shapes extending transversely to the direction of conveyance between the end portions of the lower ring, after the lower ring lifts the glass sheet upwardly off the conveyor the end portions of the lower ring being moved upwardly relative to the intermediate portions of the lower ring to contact and form the end portions of the glass sheet against the downwardly facing surface of the upper mold while the intermediate portion of the glass sheet is still located below the downwardly facing surface of the upper mold, and after the end portions of the lower ring form the end portions of the glass sheet against the downwardly facing surface of the upper mold the intermediate portions of the lower ring being moved upwardly to contact and form the intermediate portion of the glass sheet with the downwardly facing surface of the upper mold to complete the press forming.

8. A method for forming glass sheets as in claim 7 wherein the end portions of the glass sheet are each initially pressed against the downwardly facing surface of the upper mold by the end portions of the lower ring with a predetermined force that is subsequently reduced to facilitate movement of the end portions of the glass sheet along the downwardly facing surface of the upper mold as the intermediate portion of the glass sheet continues to be moved upwardly by the intermediate portions of the lower ring into contact for forming against the downwardly facing surface of the upper mold.

9. A method for forming glass sheets comprising:
initially forming a heated flat glass sheet within a heating chamber on a conveyor by inclined rolls of progressively increasing inclination along a direction of conveyance so as to have an upwardly concave curved shape with upper end portions and a lower intermediate portion extending between the end portions, with the upper end portions and the intermediate portion having shapes with straight line elements, and with the glass sheet curved transversely to the straight line elements;

conveying the initially formed glass sheet on the conveyor along the direction of conveyance into a press station above a lower ring that has: (a) end portions spaced laterally from each other relative to the direction of conveyance and extending along the direction of conveyance with respective upwardly concave curved shapes, and (b) intermediate portions spaced from each other along the direction of conveyance and extending transversely to the direction of conveyance between the end portions of the lower ring with respective upwardly concave curved shapes;

moving the lower ring upwardly to lift the initially formed glass sheet upwardly off of the conveyor toward an upper mold having a downwardly facing surface with downwardly convex curvatures both along and transverse to the direction of conveyance and complementary to the upwardly curved shapes of the end portions and the intermediate portions of the lower ring;

after the initially formed glass sheet is lifted upwardly off the conveyor, moving the end portions of the lower ring upwardly relative to the intermediate portions of the lower ring to initially contact the end portions of the glass sheet with the downwardly facing surface of the upper mold to form the straight line elements of the end portions with curvature while the intermediate portion of the glass sheet is below the downwardly facing surface of the upper mold; and thereafter moving the intermediate portions of the lower ring upwardly relative to its end portions to contact and form the intermediate portion of the glass sheet against the downwardly facing surface of the upper mold to also form the straight line elements of the intermediate portion of the glass sheet with curvature so the entire glass sheet has curvature in transverse directions.

* * * * *